(12) United States Patent
Ferrari (10) Patent No.: US 8,257,581 B2
(45) Date of Patent: Sep. 4, 2012

(54) WATER FILTER

(75) Inventor: Lana Ferrari, West Yorkshire (GB)

(73) Assignee: Parker Hannifin (UK) Limited, Hemel Hempstead Hertfordshire (GB)

( * ) Notice: Subject to any disclaimer, the term of this patent is extended or adjusted under 35 U.S.C. 154(b) by 0 days.

(21) Appl. No.: 13/307,104

(22) Filed: Nov. 30, 2011

(65) Prior Publication Data

US 2012/0103910 A1    May 3, 2012

Related U.S. Application Data

(63) Continuation of application No. PCT/GB2010/050996, filed on Jun. 15, 2010.

(30) Foreign Application Priority Data

Jun. 16, 2009 (GB) .................................. 0910325.0

(51) Int. Cl.
*B01J 49/00* (2006.01)
(52) U.S. Cl. ...................................................... 210/96.1
(58) Field of Classification Search ................. 210/96.1, 210/96.2
See application file for complete search history.

(56) References Cited

U.S. PATENT DOCUMENTS

| 3,223,240 | A | * | 12/1965 | Muller .......................... 210/96.1 |
| 3,913,513 | A | | 10/1975 | Pedone |
| 6,056,881 | A | | 5/2000 | Miller et al. |
| 2002/0104796 | A1 | | 8/2002 | Maxwell et al. |

FOREIGN PATENT DOCUMENTS

| EP | 0 177 118 A2 | 4/1986 |
| KR | 10 2007 039 661 A1 | 5/2000 |

OTHER PUBLICATIONS

Search Report under Section 17(5), dated Oct. 30, 2009 of the UK Intellectual Property Office in corresponding Great Britain Application No. GB0910325.0.
International Search Report, dated Feb. 15, 2011 in corresponding International Application No. PCT/GB2010/050996.
Notification of Transmittal of the International Preliminary Report on Patentability, dated Nov. 2, 2011 in corresponding International Application No. PCT/GB2010/050996.

* cited by examiner

*Primary Examiner* — Chester Barry
(74) *Attorney, Agent, or Firm* — Christopher H. Hunter (57) ABSTRACT

A water filter comprising a closed shell, a filter media and a valve. The closed shell having an inlet and an outlet. The filter media is within the shell and arranged such that water flowing from the inlet to the outlet passes through the filter media. The filter media is arranged to filter hydrocarbons from the water to reduce the proportion of hydrocarbons in water exiting the water filter to below a predetermined threshold. The valve is arranged such that water passing through the water filter passes through the valve. The valve comprises a chamber housing a plug of material arranged to absorb a predetermined proportion of hydrocarbons present in water passing through the valve. the plug of material changes its material properties in response to absorbing hydrocarbons to restrict or block the flow of water through the water filter before exhaustion of the filter media causes the proportion of hydrocarbons in water exiting the water filter to rise above the predetermined threshold.

7 Claims, 9 Drawing Sheets

WATER FILTER

CROSS-REFERENCE TO RELATED APPLICATIONS

This application is continuation of co-pending International Application No. PCT/GB2010/050996, filed Jun. 15, 2010, which designated the United States, and which claims priority to Great Britain Patent Application No. 09 10325.0, filed Jun. 16, 2009. the disclosure of each of which is expressly incorporated herein by reference.

BRIEF DESCRIPTION OF THE INVENTION

The present invention relates to a water filter. In particular, the present invention relates to a water filter for removing hydrocarbons and other contaminants from water separated from fuel in a fuel filter within a liquid fuel supply system. The fuel supply system may in particular be part of a vehicle, and more particularly, a diesel truck.

Fuel supply systems, and in particular vehicle fuel systems generally comprise at least one fuel filter to remove water and other contaminants from the fuel. For medium and heavy duty trucks, there is generally a need for multiple fuel filters, for instance a pre-filter for separating out water on the suction side (that is, upstream of a low pressure fuel pump) and for removing large particulate contaminants and a final filter for removing fine particles on the pressure side (that is, downstream of the low pressure fuel pump). The low pressure fuel pump is positioned upstream of the main fuel pump. It is generally necessary to continuously or periodically remove the separated water from the fuel filter in order to prevent water passing through the filter element into the fuel system and reaching the engine injector nozzles.

It is possible to filter water from the fuel supply and extract the water on the pressure side. However it may be undesirable to do so as the low pressure fuel pump is not protected from the presence of water in the fuel supply. Additionally, due to the increased flow rates on the pressure side, water separation is more difficult and consequently the fuel filter and the water drain may be more expensive.

It is generally more cost effective and efficient to separate water from fuel on the suction side (that is, the portion of the fuel system that is not pressurised as it is upstream of the low pressure fuel pump). This is particularly the case for diesel applications. Draining of the separated water on the suction side may either be done manually or automatically using a solenoid drain valve.

Regardless of whether water is filtered from the fuel supply on the suction side or the pressure side, the filtered water may be drained manually, semi-automatically or fully automatically. For manual and semi-automatic water drains a water sensor within a fuel filter is arranged to detect when the volume of water in the collection exceeds a predetermined level. The operator is then alerted, for instance by illuminating a warning light in the vehicle cabin. Manual draining requires the vehicle operator to gain access to the water filter, which may be inaccessibly mounted in the engine bay, and so is not popular amongst operators. Manual draining of water is inconvenient for the operator and if neglected can cause water to pass through the fuel filter media and enter the fuel system causing damage to the engine injector nozzles thereby reducing the life of the engine.

Known manual fuel drain valves for fuel filters allow water which has been separated from the fuel supply to be released. The water may either be collected in a separate receptacle or allowed to drain away. The operator of a manual fuel drain valve periodically releases the water, and any other contaminants present, by rotating the manual drain valve. If during a water draining operation the primary fuel filter is not pressurised by an additional pump (for instance a priming pump), a manual self-venting valve may be used. Water drains through a first hole as air enters the fuel filter through a second hole in the valve. For applications on the pressure side the manual drain does not need to be self-venting.

Alternatively, water may be drained using a solenoid fuel drain valve, which may be remotely operated by the vehicle operator in response to a warning signal in the vehicle cabin, or may be triggered automatically. Solenoid fuel drain valves are electrically operated. The solenoid cycle (that is, the opening and closing of the solenoid valve), and hence the amount of released water, is controlled by the Engine Control Unit (ECU). For applications on the pressure side, the separated water is pressurised by the pressurised fuel and so the solenoid fuel drain valve requires no additional pressurisation or air inlet in order to function. For applications on the suction side a self-venting solenoid valve must be used Regardless of the type of water drain, fuel may be inadvertently released along with the water, which unless collected and disposed of correctly is a source of pollution. Furthermore, even if pure fuel is not released, the collected water can contain 100-1400 ppm or more of dispersed hydrocarbons, which are environmentally hazardous substances. In order to comply with European Directive 2000/60/EC relating to water pollution, the amount of hydrocarbons in discharged water must be limited. The term "hydrocarbons" is intended herein to include all petroleum based hydrocarbons in a range of C7 to C40 hydrocarbon chains. Limits for hydrocarbon content are set by each individual European country. The hydrocarbon content limits can be dictated by vehicle or engine manufacturers to their fuel system suppliers. The limits for hydrocarbons in discharged water can be as low as 2 ppm. Measurement of the volume of hydrocarbons in discharged water may be performed according to ISO 9377. If not then the contaminated water must be collected and disposed of under controlled conditions. When water within the filter collection bowl builds up beyond a predetermined level and requires draining, if the vehicle is not equipped with a storage tank for the drained water the vehicle operator is supposed to stop in a depot and collect the drained water into a suitable vessel to allow the water to be disposed of in a controlled manner. However, typically the vehicle operator simply stops the vehicle where convenient and drains the contaminated water onto the road. The drained water is a source of pollution and is illegal. Furthermore, if pure diesel is spilt onto the road then this could cause accidents due to vehicles slipping on the spilt diesel.

It is known to provide filters to reduce the concentration of hydrocarbons in discharged water. For instance, a water filter may contain a material arranged to absorb hydrocarbons such as activated carbon or activated charcoal. The skilled person will be aware of other suitable materials for absorbing or adsorbing hydrocarbons. The extremely large surface area (up to $1500 \text{ m}^2.\text{g}^{-1}$) of activated charcoal allows for efficient filtration. Toxins such as hydrocarbons build up on the surface of the charcoal due to Van-der-Waals forces. A problem associated with some conventional water filters is that there is nothing to prevent water from preferentially passing through only part of the filter media, which may then become exhausted before the remainder of the media. If that occurs, unfiltered water may flow straight to the outlet.

U.S. Pat. No. 7,297,267-B2. which is assigned to Parker-Hannifin Corporation, discloses an oil-sorbing filter element for removing oil from water, for instance from bilge water from a boat. The filter element is generally cylindrical and comprises a permeable outer wall and a permeable tubular core. Between the outer wall and the core there is a filter media or optionally first and second layers of the same or differing filter media surrounding the core. In use the filter element is positioned within a filter housing such that water passes into the housing surrounding the outer wall and permeates through the outer wall into the filter element. The water then passes through the filter media and permeates through the core to exit the filter element via the tubular core. The flow path may also be reversed. The construction of the outer wall, core and filter media is intended to address problems associated with known water filters, which use fibrous or loose fill adsorbent mediums. Specifically, the filter element is intended to address the problems of filter media settling or channelling caused by the flow of the treatment stream. Settling and channelling can shorten the service life of the filter as the water being treated bypasses portions of the filter media that are not yet exhausted.

The filter media disclosed in U.S. Pat. No. 7,297,267-B2 preferably comprises an oleophilic polymeric material. The material is broadly defined as an oil-absorbing thermoplastic elastomer. The terms "oleophilic" and "oil-adsorbing" are defined as meaning that the material has an affinity to hydrocarbons or sorbs hydrocarbons and other sorbable materials, for instance diesel. More particularly, the material may be a styrenic mid-block (A-B-A) copolymer, with the mid-block being a saturated elastomer, for instance styrene-ethylene/butylene-styrene (SEBS) or styrene-ethylene/propylene-styrene (SEPS) or an unsaturated elastomer for instance styrene-butadiene-styrene (SBS) or styrene-isoprene-styrene (SIS). A particularly preferred material is a linear mid-block SEBS copolymer (30 wt % styrene) which is marketed under the name Kraton® G1652 by Kraton Polymers, Houston, Tex., US. A range of alternative materials is also disclosed.

A potential problem associated with water filters for removing hydrocarbons from water separated from a fuel supply is that due to their inaccessible position within the engine bay it can be difficult to monitor when a filter or filter cartridge requires replacement. Furthermore, the proportion of water in a fuel supply cannot be accurately predicted and so it is necessary to provide a larger filter than may be strictly required in order to ensure that the filter continues to function until the vehicle is next serviced.

It is an object of embodiments of the present invention to obviate one or more of the problems associated with the prior art, whether identified herein or elsewhere. In particular, it is an object of embodiments of the present invention to provide a water filter which filters water separated from a vehicle fuel supply such that the cleaned water may be disposed of without polluting the environment. It is a further object of embodiments of the present invention to provide a water filter that provides an indication when the capacity of the filter to filter further hydrocarbons from water has been reduced below a threshold.

According to a first aspect of the present invention there is provided a water filter comprising: a closed shell having an inlet and an outlet; a filter media within the shell arranged such that water flowing from the inlet to the outlet passes through the filter media, the filter media being arranged to filter hydrocarbons from the water to reduce the proportion of hydrocarbons in water exiting the water filter to below a predetermined threshold; and a valve arranged such that water passing through the water filter passes through the valve, the valve comprising a chamber housing a plug of material arranged to absorb a predetermined proportion of hydrocarbons present in water passing through the valve and to change its material properties in response to absorbing hydrocarbons to restrict or block the flow of water through the water filter before exhaustion of the filter media causes the proportion of hydrocarbons in water exiting the water filter to rise above the predetermined threshold.

An advantage of the present invention is that as the valve restricts the flow of water through the filter, the reduction in the flow of water can be detected thereby indicating that the filter media is approaching exhaustion and cannot efficiently filter any more water. A water sensor may detect the reduction in water flow. The water sensor may either be positioned within the water filter itself or within a fuel filter to which the water filter is coupled. In response to a signal from the water sensor indicating that the filter media is exhausted the vehicle Engine Control Unit (ECU) may provide a warning signal to the vehicle operator indicating that the water filter requires replacement.

The shell may comprise first and second ends and a side wall, the inlet being positioned in the side wall of the shell proximal to a first end and the outlet being positioned in the first end of the shell, the water filter further comprising an O-ring extending around the shell between the inlet and the first end. The shell may be generally cylindrical.

The outlet may be coupled to an outlet tube extending from the first end towards an opposite second end of the water filter and the filter media may fills all of, or at least the majority of, the space between the first and second ends of the water filter. The filter media may substantially fill the whole of the shell between the first and second ends.

The second end of the shell may be slidably coupled within the shell side wall, the water filter further comprising a compression spring coupled to the second end of the shell outside of the shell and extending above the shell such that when the water filter is coupled to a fuel filter the compression spring is compressed between the shell and the fuel filter to transfer a compressive force to the filter media within the shell.

In an alternative water filter, in place of a valve there may be provided a filter indicator layer within the shell and proximal to the outlet. The filter indicator layer may be arranged to filter hydrocarbons from the water and to restrict the flow of water through the water filter.

The water filter may further comprise first and second porous pads positioned within the shell separating the filter media from the inlet and the outlet respectively.

The filter indicator layer may extend across the shell and is sealed to the walls of the shell between the inlet and the outlet. The filter indicator layer may comprise a filter membrane. Alternatively, the filter indicator layer may comprise a filter media arranged to react with hydrocarbons to change its state so as to restrict the flow of water through the filter. The filter indicator layer may be supported by a mesh material extending across the shell between the filter indicator layer and the outlet.

The shell may comprise first and second ends and a side wall with at least one inlet positioned in the side wall of the container proximal to a first end and the outlet positioned in the second end of the container, the water filter further comprising first and second O-rings extending around the container, the or each inlet being positioned between the O-rings. The shell may comprise a generally cylindrical container.

The water filter may further comprise a compression spring between the second end of the container and the filter indicator layer arranged to press the filter indicator layer against the filter media to compress the filter media.

The shell may comprise a side wall and first and second ends with the inlet positioned in the first end and the outlet positioned in the second end of the container, the water filter further comprising an O-ring extending around the container proximal to the first end. The shell may comprise a generally cylindrical container.

The water filter may further comprise at least one baffle within the shell between the inlet and the outlet arranged to increase the length of the flow path for water passing between the inlet and the outlet.

According to a second aspect of the present invention there is provided a fuel filter, comprising: a water filter according to certain of the water filters described above; a sealed chamber having a fuel inlet and a fuel outlet separated by a filter media arranged to allow fuel to pass through and to prevent water from passing through, the fuel filter being arranged such that in use a mixture of fuel and water passes into the chamber through the fuel inlet, filtered fuel passes out of the first chamber through the outlet and water collects in the chamber, the chamber having a water outlet arranged in use to be positioned at the bottom of the chamber; a valve coupled to the water outlet; and a cavity located in an exterior portion of the chamber having a cavity inlet coupled to the valve and a cavity outlet; wherein the cavity is arranged to receive the water filter such that the cavity inlet is in fluid communication with the water filter inlet and the cavity outlet is in fluid communication with the water filter outlet.

The water filter may be received in the cavity the first and second O-rings define an annular space around the water filter and separate the cavity inlet from the cavity outlet.

The fuel filter may further comprise a water level sensor within the sealed chamber arranged to provide a water-in-fuel signal if the level of water within the sealed chamber exceeds a predetermined level.

According to a third aspect of the present invention there is provided a fuel filter, comprising: a water filter according to certain of the water filters described above; a sealed chamber having a fuel inlet and a fuel outlet separated by a filter media arranged to allow fuel to pass through and to prevent water from passing through, the fuel filter being arranged such that in use a mixture of fuel and water passes into the chamber through the fuel inlet, filtered fuel passes out of the first chamber through the outlet and water collects in the chamber, the chamber having a water outlet arranged in use to be positioned at the bottom of the chamber; a valve coupled to the water outlet; and a cavity located in an exterior portion of the chamber having a cavity inlet coupled to the valve; wherein the cavity is arranged to receive the water filter such that the cavity inlet is in fluid communication with the water filter inlet.

When the water filter is received in the cavity the O-ring may seal the water filter to the sides of the cavity to define a closed space including the cavity inlet and the water filter inlet.

The fuel filter may further comprise a water level sensor within the sealed chamber or the water filter arranged to provide a water-in-fuel signal if the level of water within the sealed chamber or the water filter exceeds a predetermined level.

According to a fourth aspect of the present invention there is provided a fuel supply system, comprising: a fuel filter as described above; and an engine control unit arranged to receive the water-in-fuel signal and arranged to control the operation of the valve to release water from the sealed chamber.

The engine control unit may be arranged to provide a warning signal to an operator if the water-in-fuel signal is indicative of a restriction in the flow of water through the filter indicator layer after releasing water from the sealed chamber.

According to a fifth aspect of the present invention there is provided a fuel filter, comprising: a water filter according to certain of the water filters described above; a sealed chamber having a fuel inlet and a fuel outlet separated by a filter media arranged to allow fuel to pass through and to prevent water from passing through, the fuel filter being arranged such that in use a mixture of fuel and water passes into the chamber through the fuel inlet, filtered fuel passes out of the first chamber through the outlet and water collects in the chamber, the chamber having a water outlet arranged in use to be positioned at the bottom of the chamber; a valve coupled to the water outlet; and a cavity located in an exterior portion of the chamber having a cavity inlet coupled to the valve; wherein the cavity is arranged to receive the water filter such that the cavity inlet is in fluid communication with the water filter inlet and the cavity outlet is in fluid communication with the water filter outlet.

The fuel filter may further comprise a water level sensor within the sealed chamber arranged to provide a water-in-fuel signal if the level of water within the sealed chamber exceeds a predetermined level; and a processor arranged to receive the water-in-fuel signal and arranged to control the operation of the valve in response to the water-in-fuel signal to selectively release water from the sealed chamber to the water filter according to a predetermined water release cycle.

The processor may be arranged to provide an output signal indicating that a water release cycle has taken place. The output signal may be received by an engine control unit which is arranged to count the number of water release cycles and to provide an output signal indicating that the water filter requires servicing when a predetermined number of cycles has been reached. Alternatively, the fuel filter processor may be arranged to count the number of water release cycles and to provide an output signal indicating that the water filter requires servicing when a predetermined number of cycles has been reached.

According to a sixth aspect of the present invention there is provided a method of filtering water comprising: providing a water filter comprising a closed shell having an inlet and an outlet and a filter media within the shell; and receiving water through the inlet, the filter media being arranged such that water flowing from the inlet to the outlet passes through the filter media, the filter media being arranged to filter hydrocarbons from the water to reduce the proportion of hydrocarbons in water exiting the water filter to below a predetermined threshold; wherein the water filter further comprises a valve arranged such that water passing through the water filter passes through the valve, the valve comprising a chamber housing a plug of material arranged to filter hydrocarbons from the water and to change its material properties in response to absorbing hydrocarbons to restrict the flow of water through the water filter before exhaustion of the filter media causes the proportion of hydrocarbons in water exiting the water filter to rise above the predetermined threshold.

The method may further comprise: providing a fuel filter comprising a sealed chamber having a fuel inlet and a fuel outlet separated by a filter media arranged to allow fuel to pass through and to prevent water from passing through, a valve coupled to a water outlet and a cavity located in an exterior portion of the chamber having a cavity inlet coupled to the valve, wherein the cavity is arranged to receive the water filter such that the cavity inlet is in fluid communication with the water filter inlet; receiving a mixture of fuel and water through the fuel inlet such that filtered fuel passes out of the first chamber through the outlet and water collects in the chamber; and controlling the valve to release water from the chamber through the water outlet such that the water is received in the water filter inlet.

The method may further comprise: providing a water level sensor within the sealed chamber or the water filter arranged to provide a water-in-fuel signal if the level of water within the sealed chamber exceeds a predetermined level; and controlling the operation of the valve to release water from the sealed chamber at an engine control unit in response to the water-in-fuel signal.

The method may further comprise: providing a warning signal to an operator if the water-in-fuel signal is indicative of a restriction in the flow of water through the filter indicator layer after releasing water from the sealed chamber.

BRIEF DESCRIPTION OF THE DRAWINGS

The present invention will now be described, by way of example only, with reference to the accompanying drawings, in which.

DETAILED DESCRIPTION OF THE PREFERRED EMBODIMENT

Figure 1:
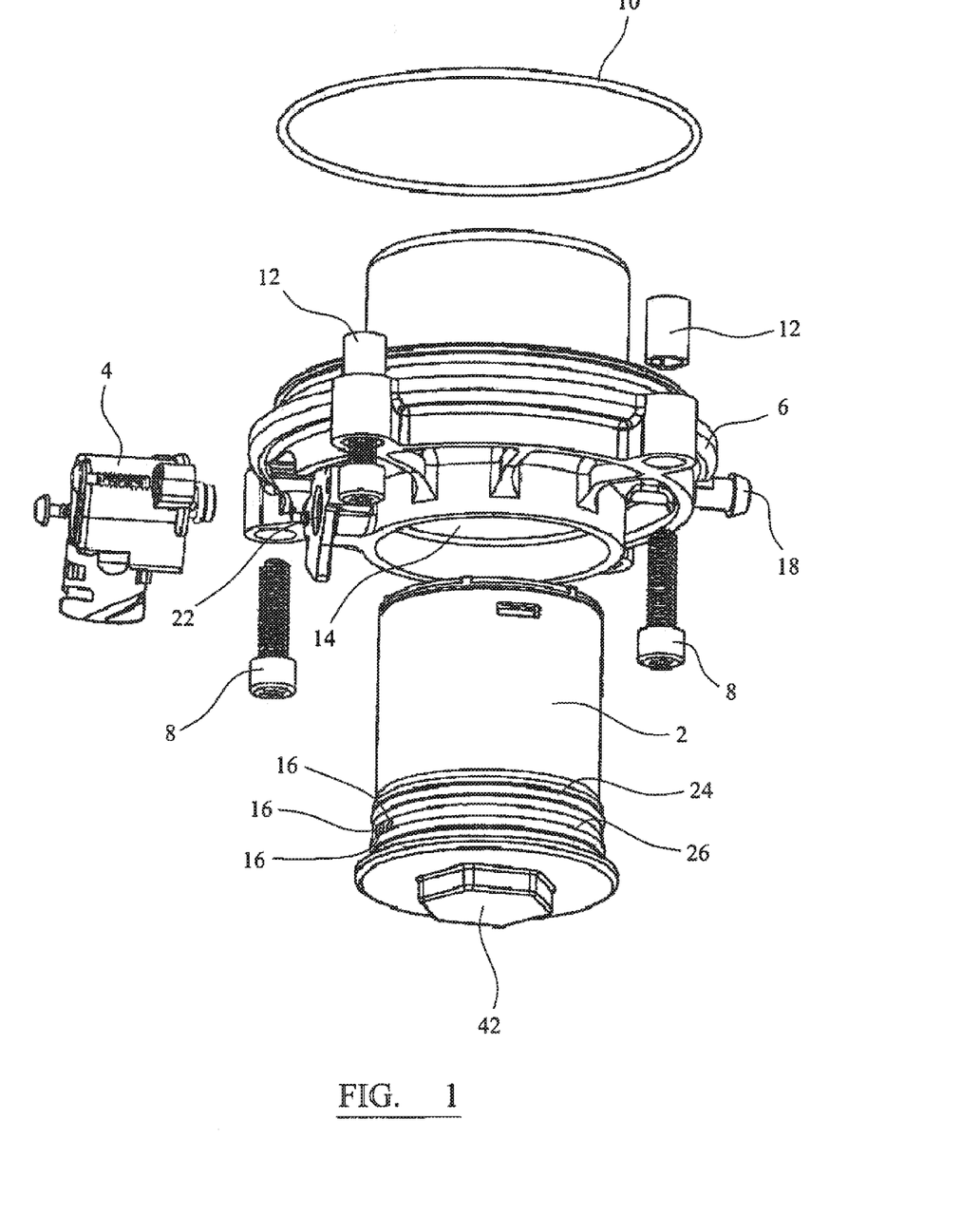
FIG. 1 is an exploded view of a water filter, solenoid valve and a base of a fuel filter.

Referring first to FIG. 1, this illustrates in an exploded view a water filter 2, solenoid valve 4 and a fuel filter bowl 6. The filter bowl 6 is arranged to be coupled to a filter housing forming the remainder of a filter body (not illustrated) by screws 8 and sealed to the housing to form a closed filter body by an O-ring 10. Space limiters 12 serve to give structural support to the filter bowl 6 against mechanical load during vehicle operation. The water filter 2 is received within cavity 14 within the filter bowl 6 which in use is underneath the filter body, and secured in position by a screw thread coupling, as will be explained below in connection with FIGS. 2 and 3.

The water filter 2 of FIG. 1 is arranged to be coupled to a fuel fitter positioned on the pressure side of a vehicle fuel supply system (that is, downstream of low pressure fuel pump generating up to approximately 6 bar). The pressurised fuel serves to drive water through the water filter 2. In normal use water is driven from an inlet 16 or a series of inlets 16 towards the bottom of the water filter 2 and coupled to the solenoid valve 4. Cleaned water is driven out through an outlet positioned in the upper part of the water filter 2. The cleaned water then passes downwards around the outside of the water filter 2 within the cavity 14 to an outlet 18 positioned in the filter bowl 6. Outlet 18 may be coupled to a storage tank (not illustrated) or via a hose to a position within the engine bay where the cleaned water may be discharged onto the road.

Within the filter body there is provided at least one water sensor (not illustrated) arranged to provide a water level signal to the Engine Control Unit (ECU) when the water collected within the filter body exceeds a predetermined level. The ECU is arranged to control the solenoid valve 4 to open for a predetermined period of time to release water under the pressure of the fuel via an outlet 20 from the filter bowl (visible in FIG. 3), through the valve 4 and into cavity 14 via passage 22. The length of time for which the solenoid valve 4 is open is chosen to ensure that the water within the filter does not fall below a minimum level, thereby ensuring that pure fuel does not enter the water filter 2. The length of time for which the solenoid valve is open may be proportional to the volume of water in the filter body, the pressure within the filter and the desired volume of water to be injected into the water filter.

The water is contained between the side wall of the cavity 14 and the water filter 2 by first and second O-rings 24, 26. The water then passes into the inside of the water filter 2 though inlet holes 16. The inlet holes 16 may be offset around the water filter 2 from the passage 22 to reduce the risk of a jet of water passing through the inlet holes 16 and disrupting the filter media. The water is gradually cleaned as it passes upwards through the filter media within the water filter (as will be described below in connection with FIG. 2) before passing through the outlet at the top of the water filter 2 and out of outlet 18 within the filter bowl 6. As the filter 2 is filled from the bottom, this reduces the chance of water preferentially passing through only part of the filter media. Consequently, the filter media absorbs hydrocarbons evenly across the filter and progressively from the bottom of the filter towards the top. The water is gradually cleaned as it flows upwards and the filter media is gradually exhausted from the bottom upwards.

O-ring 24 prevents the cleaned water being contaminated by water entering cavity 14 from passage 22. The water is pushed upwards through the water filter 2 by the injection of further water when the solenoid valve is next opened. The volume of the water filter, and the amount of water released by each actuation of the solenoid valve 4, are chosen to ensure that water remains within the water filter 2 for a minimum period of time, for instance 20 minutes, to ensure sufficient cleaning before leaving the filter. Typically half of the volume of the water filter 2 (for instance 50 ml) is injected by the solenoid valve each time it is activated.

Figure 2:
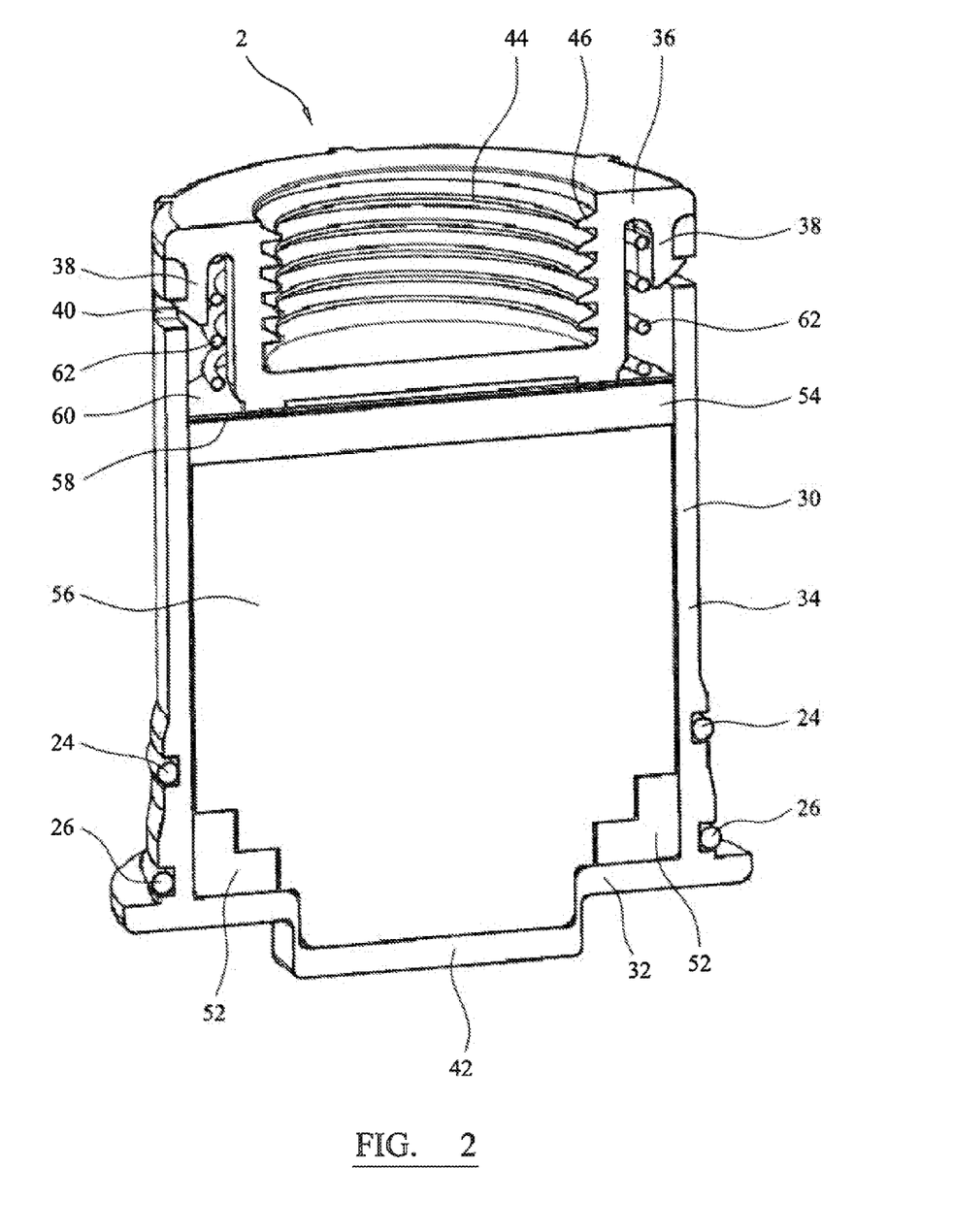
FIG. 2 is a cross sectional view of the water filter of FIG. 1.
Figure 3:
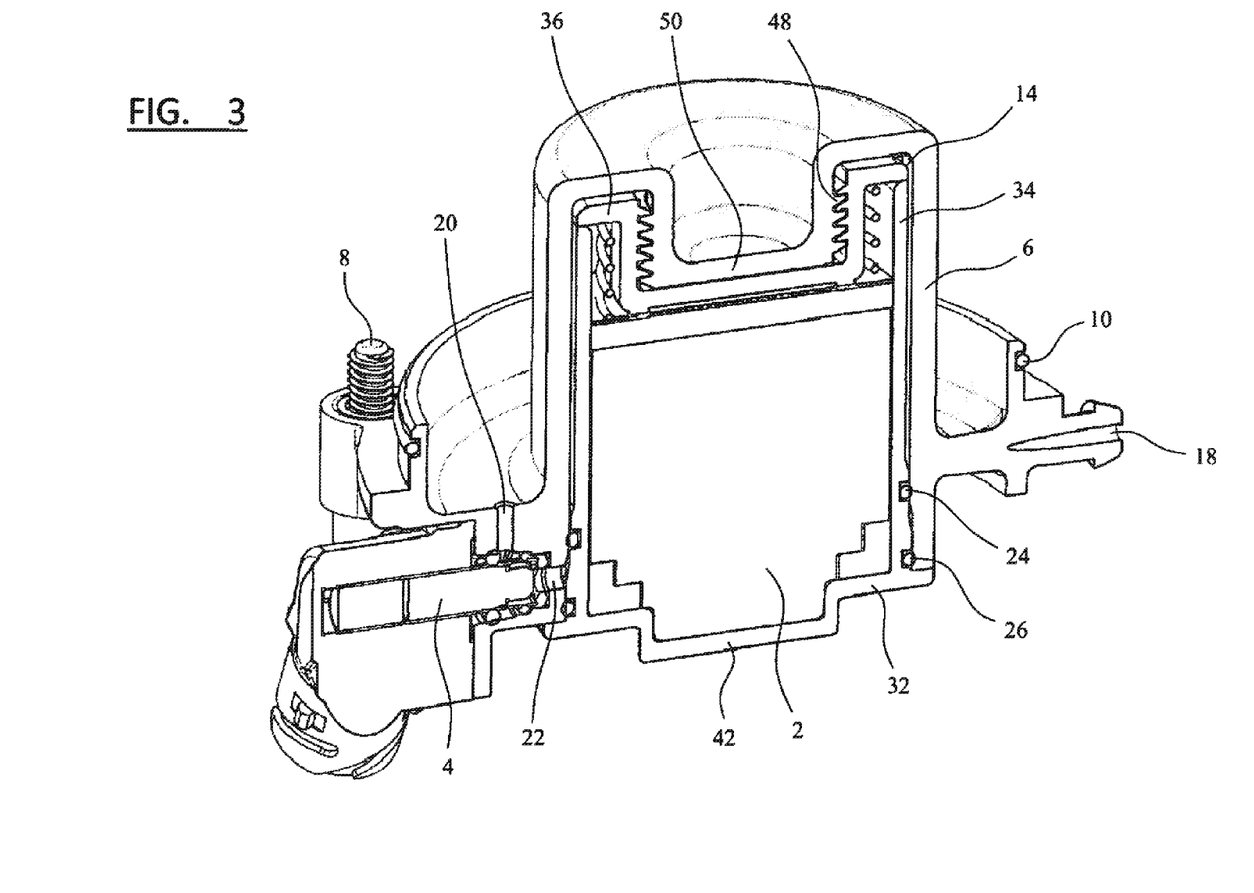
FIG. 3 is a cross sectional assembled view of the water filter, solenoid valve and fuel fitter base of FIG. 1.

Referring now to FIG. 2, the water filter 2 of the first embodiment of the present invention is illustrated in cross section. The water filter 2 is formed from a shell 30 comprising a base 32, side walls 34 and a cap 36. The shell 30 may be formed from a plastics material, a metallic material or any other suitable material suitable for forming fuel and water filters. The base 32 and the side walls 34 may be integrally formed. The cap 36 may be either welded to the side walls 34 (as illustrated in FIG. 3) or secured with a sprung clip 38 engaging a recess 40 (as illustrated in FIGS. 1 and 2). The base 32 is formed with a hexagonal grip 42 allowing a user to rotate the filter 2 as it is inserted into cavity 14. The cap 36 has a recess 44 with an interior screw thread 46. Screw thread 46 is arranged to engage an exterior screw thread 48 upon a protruding portion 50 within cavity 14 (visible in FIG. 3) to secure the filter 2 within the fuel filter bowl 6.

Inlet holes 16 are formed in the side wall 34 between O-rings 24, 26. The inlet holes 16 are not visible in the cross sectional view of FIG. 2 as they are within the cut away portion. The or each filter outlet (not visible in FIG. 2) is formed generally towards the top of the filter 2, for instance in the upper surface of cap 36.

Within the water filter 2 there is positioned a first pad 52 formed as an annular ring and positioned in the bottom portion of the filter 2. First pad 52 is arranged to cover the inlet holes 16 to reduce the tendency of the injected water to disrupt the filter media. The pad 52 is formed from a porous material such as a sponge. The pad is required to be formed from a material which is resistant to oil and other contaminants which might pass through without reducing its structural integrity and the support it provides to the filter media. Pad 52 may additional assist in distributing the injected water around the whole of the filter, thereby reducing the risk of water passing preferentially through a small portion of the filter media. A second pad 54 is positioned towards the top of the filter 2 and extends across the full width of the filter, again serving to contain the filter media. In particular, if the filter media is loose the second pad 54 assists in reducing movement of the filter media.

The filter media 56 fills the volume of the filter between the pads 52, 54. The filter media 56 can be a loose media or a solid media. Any suitable media material which can filter hydrocarbons (and possibly other contaminants) from water may be used. Examples include activated carbon or charcoal, Sorbflow V (available from Parker Hannifin Corporation of the US) and Wavestream, Ecolok and Solviro (all available from Wave International Limited of the UK). U.S. Pat. No. 7,297, 267-B2, which is discussed above in the introduction, provides details of a range of other suitable filtering mediums including oil-absorbing thermoplastic elastomers. Other suitable materials will be readily apparent to the skilled person. Certain of the above listed filter media materials require a positive pressure to be applied to the water in order to force the water through the filter media. Additionally, as discussed above, the water flows vertically upwards through the water filter 2, and the outlet from the filter is above the base of the fuel filter bowl 6, requiring the water to be pressurised to flow through the filter. Consequently, embodiments of the water filter of FIG. 2 using certain filter media materials may only suited to fuel filters on the pressure side where the fuel is pressurised, for instance to between 4 Bar and 6 Bar.

Above the second pad 54 there is positioned a filter indicator layer comprising a filter membrane 58 or other filter media which extends across the full width of the filter and is sealed to the side walls 34. The filter membrane 58 may for instance be a NF Membrane (Nano-Filtration Membrane available from Parker Hannifin Corporation of the US). The filter membrane 58 is arranged to filter any remaining hydrocarbons which have passed through the filter media 56. Furthermore, the filter membrane 58 is arranged to absorb the hydrocarbons such that the filter becomes progressively impermeable to water. The filter membrane 58, and in particular the pore size, is chosen to ensure that hydrocarbons are trapped, while allowing small particles, for instance salts, to pass through unfiltered. The filter membrane 58 only begins to absorb significant amounts of hydrocarbons once the main filter media 56 becomes spent such that substantially unfiltered water passes to the filter indicator layer. Consequently, the filter indicator layer alert reduces or stops the flow of water through the water filter, which may be detected to trigger an alert to the vehicle operator indicating that the water filter 2 requires replacement.

When the filter membrane 58 blocks the further flow of water, or the flow of water is significantly restricted, operation of the solenoid valve 4 does not result in a reduction in the level of water within the fuel filter, or the reduction in water level is not as great as normal during the predetermined opening time of the valve 4. This may be monitored by the ECU by detecting if the water in fuel sensor continues to indicate that the water level remains above a predetermined level even after the solenoid valve 4 has been operated. The vehicle operator may then be alerted, for instance by illuminating a warning light in the vehicle cabin, so that a replacement water filter may be fitted. Alternatively, the warning light may not be illuminated until the ECU detects that the water level has failed to reduce sufficiently after a number of operations of the valve, for instance three times.

Alternatively the filter membrane 58 may be replaced by a layer of filter media which is chosen to reduce its transmission of water as it becomes exhausted due to absorbing hydrocarbons, for instance Sorbflow V. In particular, the filter media may comprise a powder which chemically reacts with hydrocarbons to change its state, for instance to form a liquid, gel or solid, which restricts the further flow of water through the filter indicator layer. The filter indicator layer media may be contained within a bag or between two layers of a mesh to prevent it dispersing within the filter.

The filter membrane 58 or the filter indicator layer media must be capable of withstanding pressure spikes within the water, caused by pressure variation within the fuel supply system, without damage. For instance, the pressure in the water may reach 33 Bar. In order to support the membrane 58 or media a mesh 60, for instance made from steel, may be provided to reinforce the membrane 58. Furthermore, the mesh 60 and membrane 58 may be pressed against the pad 54 by a compression spring 62. The spring 62 serves to compress the main filter media 56 in order to increase its filtering efficiency. The spring 62 may not be required if a solid filter media is used.

Referring now to FIG. 3, this illustrates the water filter 2, solenoid valve 4 and fuel filter bowl 6 of FIG. 1 assembled together in a cross sectional view further illustrating the flow path for water through the water filter 2. Water passes from the fuel filter bowl 6 through outlet 20 into solenoid valve 4. Water exits valve 4 through passageway 22 into the annular space between side wall 34 of the water filter 2 and the wall of cavity 14 between O-rings 24, 26. Water can flow all of the way around the water filter 2. Water flows from the annular space through water filter inlets 16 (not visible in FIG. 3), which as noted above may be spaced apart from passageway 22, for instance by 90° around the filter. Inlets 16 may alternatively be distributed about the filter 2. Water then flows upwards through the water filter 2 to the cap 36 where it flows out from the filter through one or more outlets (not visible). The cleaned water then flows around the water filter 2 within cavity 14 to the water outlet 18 (which extends all of the way to the annular space within the cavity 14 surrounding the water filter 2, though this is not clearly visible in FIG. 3).

Figure 4:
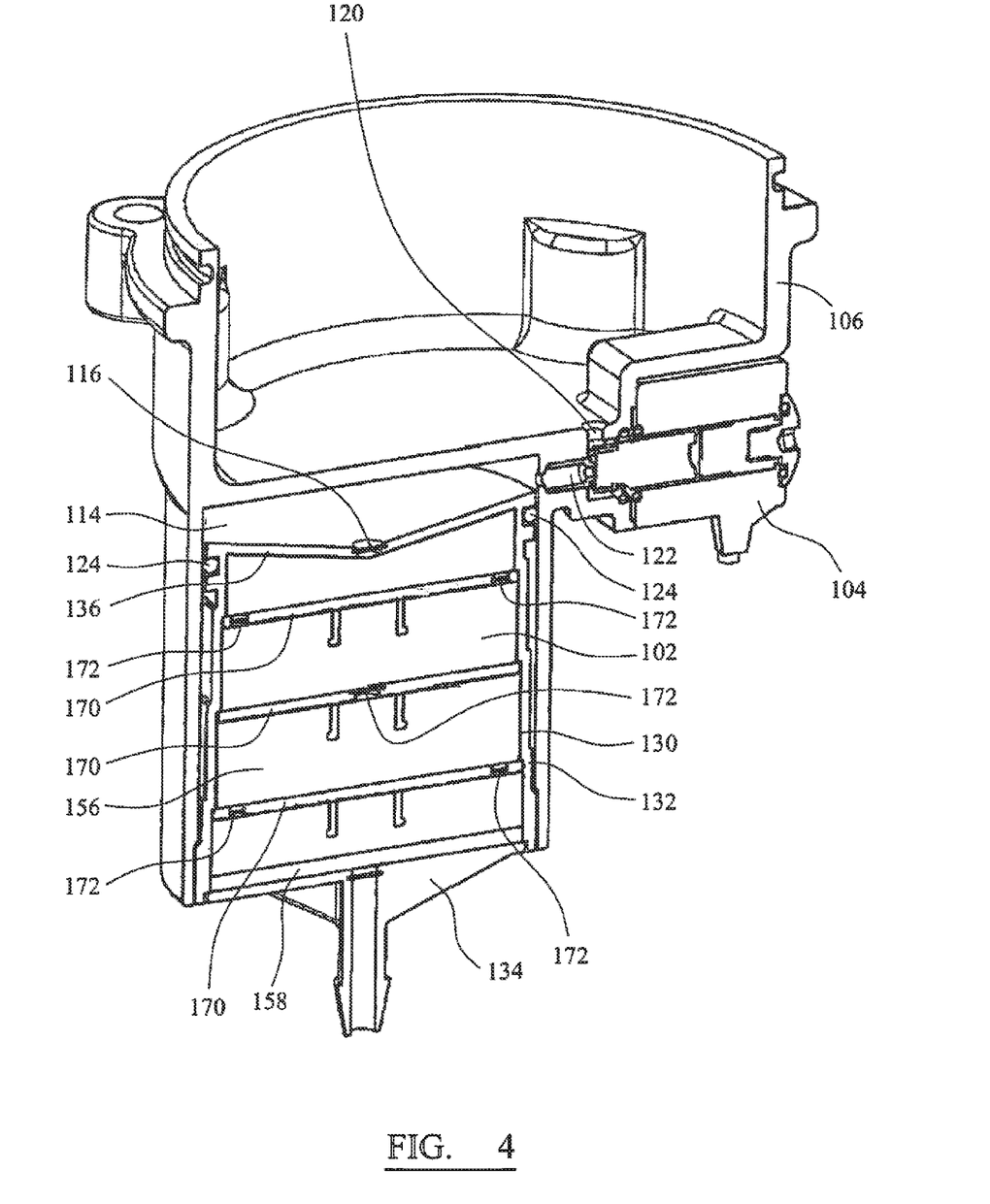
FIG. 4 is a cross sectional assembled view of an alternative water filter, solenoid valve and fuel filter base.

As discussed above, water filters illustrated in FIGS. 1 to 3 may only be suited to applications on the pressure side of a fuel supply. For cleaning water separated in a fuel filter on the suction side of a fuel supply a water filter 102 is illustrated in FIG. 4. Features of FIG. 4 corresponding to those of FIGS. 1 to 3 are indicated by reference numbers, which have been incremented by 100. Water filter 102 is received within a cavity 114 formed within an underside of a fuel filter bowl 106. Under the control of a solenoid valve 104, in turn controlled by an ECU using signals from water level sensors (not illustrated) within the fuel filter bowl 106, water flows from the bowl 106 through outlet 120 and into cavity 114 through passage 122.

Water filter 102 is formed from a shell 130 comprising a base 132, side wall 134 and top cap 136. The shell 130 is sealed within the cavity by O-ring 124. Water within cavity 114 enters the interior of the water filter 102 under gravity through an inlet 116 in a depressed central portion of the top cap 136. The interior of water filter 102 is filled by a main filter media 156. Additionally, baffles 170 are provided within the shell 130 with holes 172 alternately in a central portion or about the periphery of the baffle 170. The baffles 170 increase the length of the flow path for water passing through the main filter media 156. Increasing the water flow path increases the time for which the water is in contact with the filter media 156. Furthermore, increasing the flow path assists in exposing the filter media evenly to hydrocarbons such that the water is gradually cleaned as it flows towards the bottom of the filter and the filter media is progressively exhausted from the top of the filter downwards. The filter media 156 is chosen from a reduced choice of materials compared with the first embodiment of the present invention as the filter media material must permit water to pass through without requiring the water to be pressurised. For instance, the filter media may be activated carbon, which does not require a pressure differential to be generated across the filter media. A moulded mesh may be provided extending across holes 172 to prevent loose filter media from passing through the holes.

Towards the bottom of the water filter 102 there is provided a filter membrane 158 or an additional filter media. As for the first embodiment of the present invention the filter membrane is arranged to restrict the flow of water once it absorbs hydrocarbons to indicate that the water filter requires replacement. The reduction in flow of water may be detected by providing a further water sensor (not illustrated) within the shell 130 to indicate when the water level exceeds a predetermined level due to the reduction in flow of water through membrane 158. Alternatively, as for the first embodiment of the present invention, the restriction in water flow due to the filter indicator layer becoming exhausted may be detected by the water sensors within the filter bowl failing to indicate a reduction in water level when the valve is opened.

There is now described a water filter in accordance with an embodiment of the invention in connection with FIGS. 5 to 9. The water filter of the embodiment of the invention shares certain similarities with the water filters illustrated in FIGS. 1 to 3 and so corresponding features are indicated by reference features, which have been incremented by 200. Where features of the embodiment of the invention are not stated to differ from those of the water filter of FIGS. 1 to 3 it may be assumed that the description of the FIGS. 1 to 3 also applies to that of FIGS. 5 to 9. Additionally, certain features of the embodiment of the invention may be incorporated into the water filters of FIGS. 1 to 4.

Figure 5:
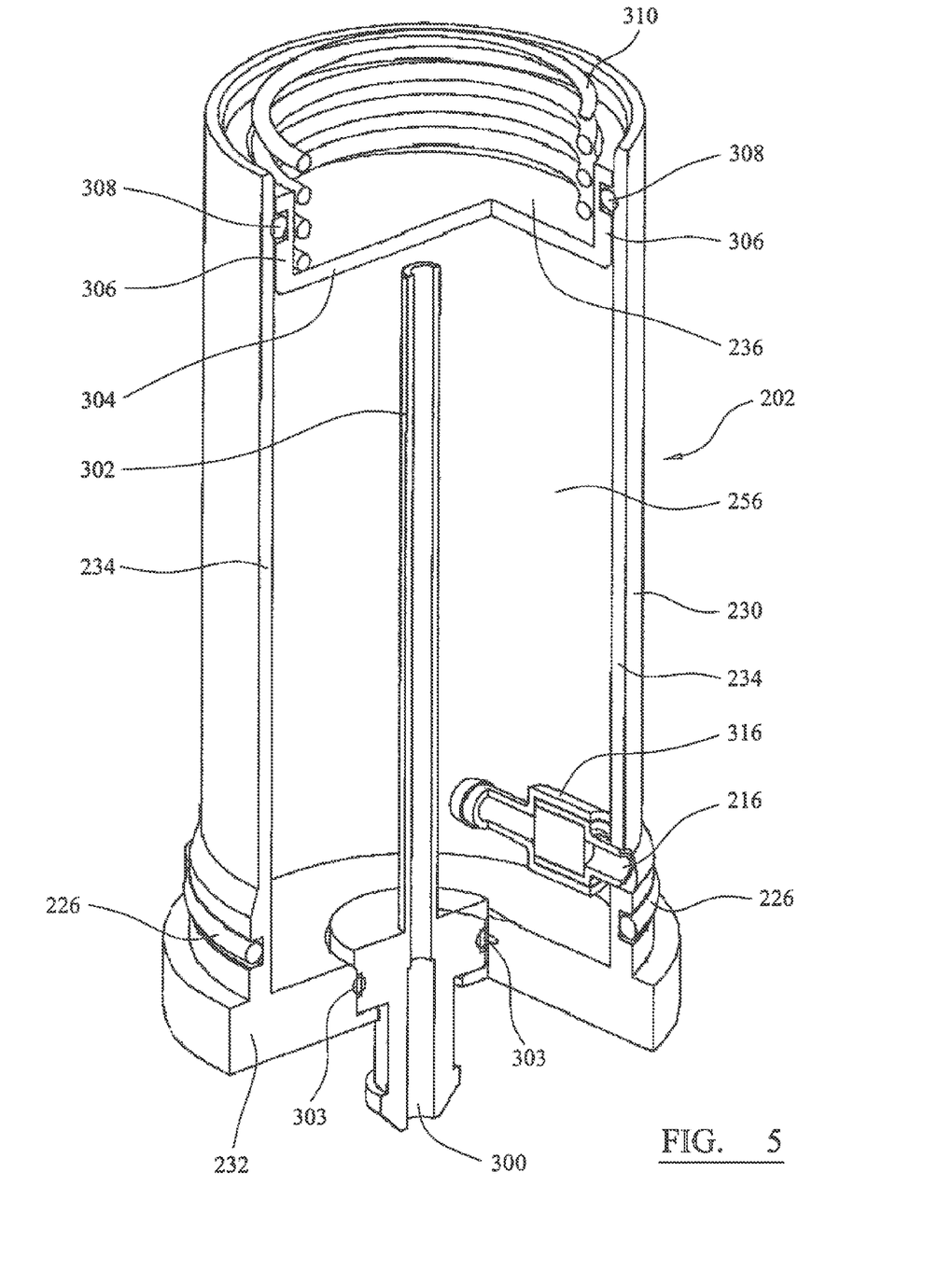
FIG. 5 is a cross sectional view of a water filter in accordance with an embodiment of the present invention.

Referring to FIG. 5, the water filter 202 of the third embodiment of the present invention is illustrated in cross section. The line of cross section has been chosen to intersect both the inlet 216 and the outlet 300, so as to clearly illustrate the flow of water through the filter. It can be seen that the outlet 300 is generally positioned in a central part of the base of the water filter 202 and is coupled to an outlet tube 302 extending upwards towards the top of the water filter 202. It can be seen in FIG. 5 that the outlet 300 and outlet tube 302 are formed separately to the shell 230 and are couple to the shell 230 and sealed by O-ring 303. The inlet 216 enters through a sidewall of the water filter 202, generally towards the base of the water filter 202 and extends inwards. However, it can be seen that the inlet 216 does not extend directly towards the centre of the water filter 202 and so line of cross section comprises a segment removed from the water filter 202.

The water filter 202 is formed from a shell 230 comprising a base 232, sidewalls 234 and a cap 236. The shell 230 may be formed from a plastics material, a metallic material or any other suitable material suitable for forming fuel and water filters. The base 232 and the sidewalls 234 may be integrally formed. The cap 236 is generally cup shaped and comprises a plate 304 and a sidewall 306 arranged to be received within an open end of the shell sidewall 234. An O-ring 308 is provided between the cap 236 and the filter sidewall 234 in order to seal the cap 236 to the sidewall 234 and to prevent entry or escape of fluids. A spring 310 is provided coupled to the cap 236. The spring 310 extends above the top of the sidewall 234. When the filter 202 is coupled to a fuel filter base 312 (as will be described below in connection with FIGS. 7 and 8) the spring 310 is compressed between the fuel filter base and the cap 236. Consequently, the spring 310 presses downwards on the cap 236, which in turn compresses the filter media 256 within the shell 230, which reduces the effect of the any settling of the filter media 256 which could otherwise cause preferential flow paths to develop between the inlet 216 and the outlet 300 bypassing active portions of the filter media. The base 232 is formed with connecting lugs 314 (not visible in FIG. 5, but one of which is visible in FIG. 7) with holes arranged to receive bolts 208 passing through the lugs 314 and into the fuel filter base 312 to secure the water filter 202 to the fuel filter base 312 and to compress spring 310. That is, unlike the first embodiment, the water filter 202 simply slots into a cavity in the underside of the fuel filter base 312 and is secured with bolts, rather than being provided with a screw thread. While shell 230 is illustrated as being generally cylindrical, it will be appreciated that the shape may vary, especially because it is not required to be screwed into position within a cavity forming part of the fuel filter base 312.

Inlet 216 is formed in the sidewall 234 above the level of O-ring 226. As will be explained further in connection with FIG. 8, O-ring 226 seals the water filter 202 within a cavity in the underside of filter base 312. An annular space is formed within the cavity around the water filter 202 and is sealed by O-ring 226. Inlet 216 is coupled to an inlet valve 316. Water to be filtered passes from the annular space surrounding the water filter 202, through inlet 216 and valve 316 into the body of the water filter 202. The water then flows upwards through the filter towards the cap 236 and then the filtered water passes down centre tube 302 and out of outlet 300. It will be appreciated that the relative positions of inlet 216, outlet 300, valve 316 and tube 302 may vary. The main requirement is that the inlet 216 and outlet 300 are spaced apart to ensure that the water passes through a large volume of filtering medium (described below) in order to filter hydrocarbons. As for the first embodiment, it is desirable that the water passes upwards through the filter (that is, the filter is filled from the bottom) to ensure even distribution and filtering of the water through the filtering medium 256 and to increase the residency time of water in the filter 202. The first embodiment of the invention has pads positioned proximal to the inlet and outlet to reduce jetting of water through the filter media and to assist in reducing movement of the filtering medium within the shell. Pads are not illustrated in FIG. 5, though they may be provided.

The filter media 256 fills the volume of the filter 202 between the base 232 and the cap 236. The filter media 256 may be spaced apart from the inlet valve 316 and outlet tube 302 to prevent filter media 256 from escaping from shell 230. For instance, a mesh or sponge material may be provided at the valve 316 and tube 302. As for the first embodiment, the filter media 256 can be a loose media or a solid media. Any suitable media material that can filter hydrocarbons (and possibly other contaminants) from water may be used. Examples include activated carbon or charcoal, Sorbflow V (available from Parker Hannifin Corporation of the US) and Wavestream, Ecolok and Solviro (all available from Wave International Limited of the UK). U.S. Pat. No. 7,297,267-B2, which is discussed above in the introduction, provides details of a range of other suitable filtering mediums, and in particular oil-absorbing thermoplastic elastomers. Other suitable materials will be readily apparent to the skilled person. Certain of the above listed filter media materials require a positive pressure to be applied to the water in order to force the water through the filter media. Additionally, as will be evident from FIGS. 7 and 8, the water flows vertically upwards through the water filter 202, and the outlet from the filter is above the base of the fuel filter base 312, requiring the water to be pressurised to flow through the filter. Consequently, embodiments of the water filter of FIG. 5 using certain filter media materials may only suited to fuel filters on the pressure side where the fuel is pressurised, for instance to between 6 Bar and 8 Bar.

Figure 6:
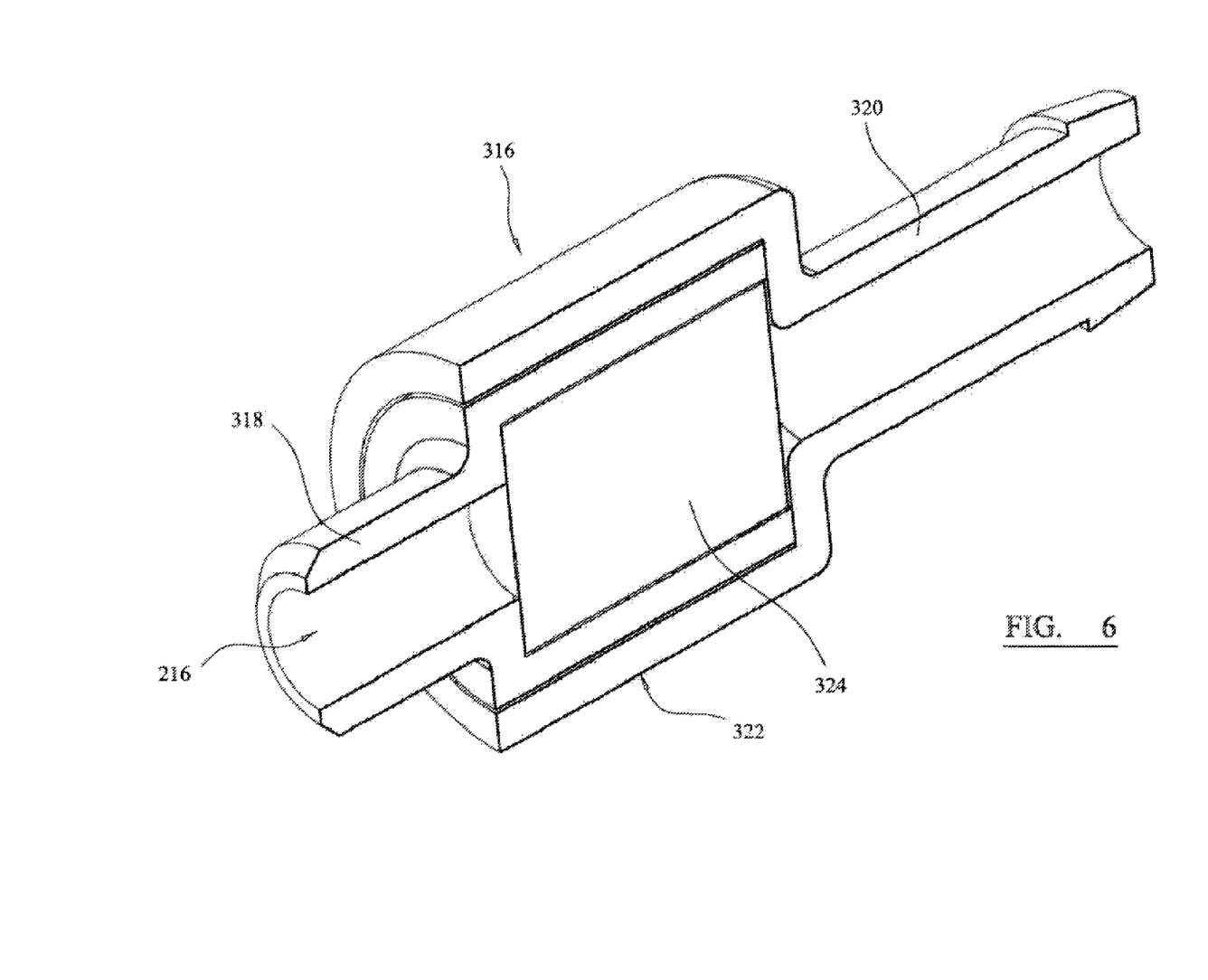
FIG. 6 is an enlarged cross sectional view of a valve forming part of the water filter of FIG. 5.

Referring now also to FIG. 6, as noted above a valve 316 is coupled to the inlet 216 such that water passing into the filter 202 passes through the valve 316. However, it will be appreciated that in alternative embodiments of the present invention the valve 316 may be positioned elsewhere so long as all water passing through the water filter 202 passes through the valve 316. For instance, in alternative embodiments the valve 316 may be positioned proximal to the water filter outlet 300. Valve 316 comprises a filter indicator and is functionally equivalent to the filter indicator layer of the first and second embodiments. Consequently, no such filter indicator layer needs to be provided in the water filter of FIG. 5, though of course a filter indicator layer may be provided in addition to the valve 316.

Valve 316 comprises an inlet tube 318 coupled to the shell wall 234 to form inlet 216. An outlet tube 320 discharges water into the body of the water filter 202 towards the bottom of the water filter 202. Inlet and outlet tubes 318, 320 are coupled together at widened portions of the tubes to form a cavity 322.

Within cavity 322 there is provided a tablet or plug of material 324, which extends across the full width of the cavity 322 such that all water entering the water filter 202 passes through the plug 324. The plug 324 is formed from a material arranged to absorb hydrocarbons from the water and may be similar or dissimilar to the bulk filter media 256. In particular, the material of plug 324 is chosen to reduce the flow of water through the valve 316 as hydrocarbons are absorbed. More particularly, the material is chosen to substantially reduce or fully block the flow of water through the valve after a predetermined volume of water, at a predetermined concentration of hydrocarbons, has passed through valve 316. The reduction in water flow may be detected, as will be described below in connection with FIGS. 7 to 9, which indicates that the water filter requires replacement. The reduction in water flow also causes an increase in the pressure difference across the valve 316.

When plug 324 changes state and reduces or stops the flow of water into the water filter 202, the pressure across plug 324 increases. Similarly, for the first and second embodiments of the invention described above, when the filter indicator layer 58, 158 reduces the flow of water, the pressure across the membrane increases. As the membrane extends across the full width of the water filter the force applied to the membrane through the water pressure is significant and consequently the membrane may require reinforcement to maintain its integrity. Advantageously, the plug 324 within valve 316 extends across a small cross sectional area within cavity 322 and so the force applied to the plug for the same rise in differential pressure is smaller. Consequently, plug 324 may provide a more secure seal to reduce the flow of water.

While plug 324 does perform filtering of the water, in that it absorbs hydrocarbons from water passing through, this is not its main function. Indeed, given the small volume of plug 324 relative to the bulk filtering medium 256 filling the remainder of shell 230, it will be appreciated that the filtering effect of plug 324 is minimal. Rather, the plug 324 is arranged to absorb a predetermined proportion of the hydrocarbons present in the water as it passes into the filter 202 to reduce or fully block the flow of water through the valve 316 when the filtering medium 256 is exhausted and consequently the capacity of the water filter 202 to filter hydrocarbons from the water to below a predetermined threshold has been degraded. In practice, a safety margin is built into the design of the plug 324 such that the flow of water through the valve 316 is reduced before the filtering medium 256 is fully exhausted. The material from which plug 324 is formed may be chosen to ensure that hydrocarbons are trapped, while allowing small particles, for instance salts, to pass through unfiltered.

In order to reduce or block the flow of material through the valve 316, the material of plug 324 is chosen such that as hydrocarbons are absorbed the physical properties of the plug change. For instance, it may be desirable for the plug to become more viscous, or partially or fully solidified. The change of state of the plug 324 may cause the plug to grow in size, which may result in the plug material distending through either the inlet or outlet tubes 318, 320, which may beneficially increase the effectiveness of the valve. The material of plug 324 may be chosen to provide a gradual reduction in the flow of water as hydrocarbons are absorbed, or to provide a more sudden reduction in flow of water once the amount of hydrocarbons absorbed exceeds a predetermined threshold. The shape of the plug 324 and the cavity 322 may also affect the type of response to absorbed hydrocarbons. Suitable materials include Sorbflow V, which has been demonstrated to form a thick, viscous fluid when hydrocarbons are absorbed. Sorbflow V can also expand as a 10 g plug of Sorbflow V can absorb around 35 g of hydrocarbons. Kraton® G1652 may also be suitable as 10 g of Kraton® G1652 absorbs around 70 g of hydrocarbons to form a jelly like or rubbery material, which can be substantially impervious to water. U.S. Pat. No. 7,297,267-B2 discloses a range of materials which may be suitable, and which are described in the introduction above. It will be apparent to the appropriately skilled person that the appropriate material is dependent upon the required form of the reduction of water flow as the bulk filtering medium becomes exhausted.

Figure 7:
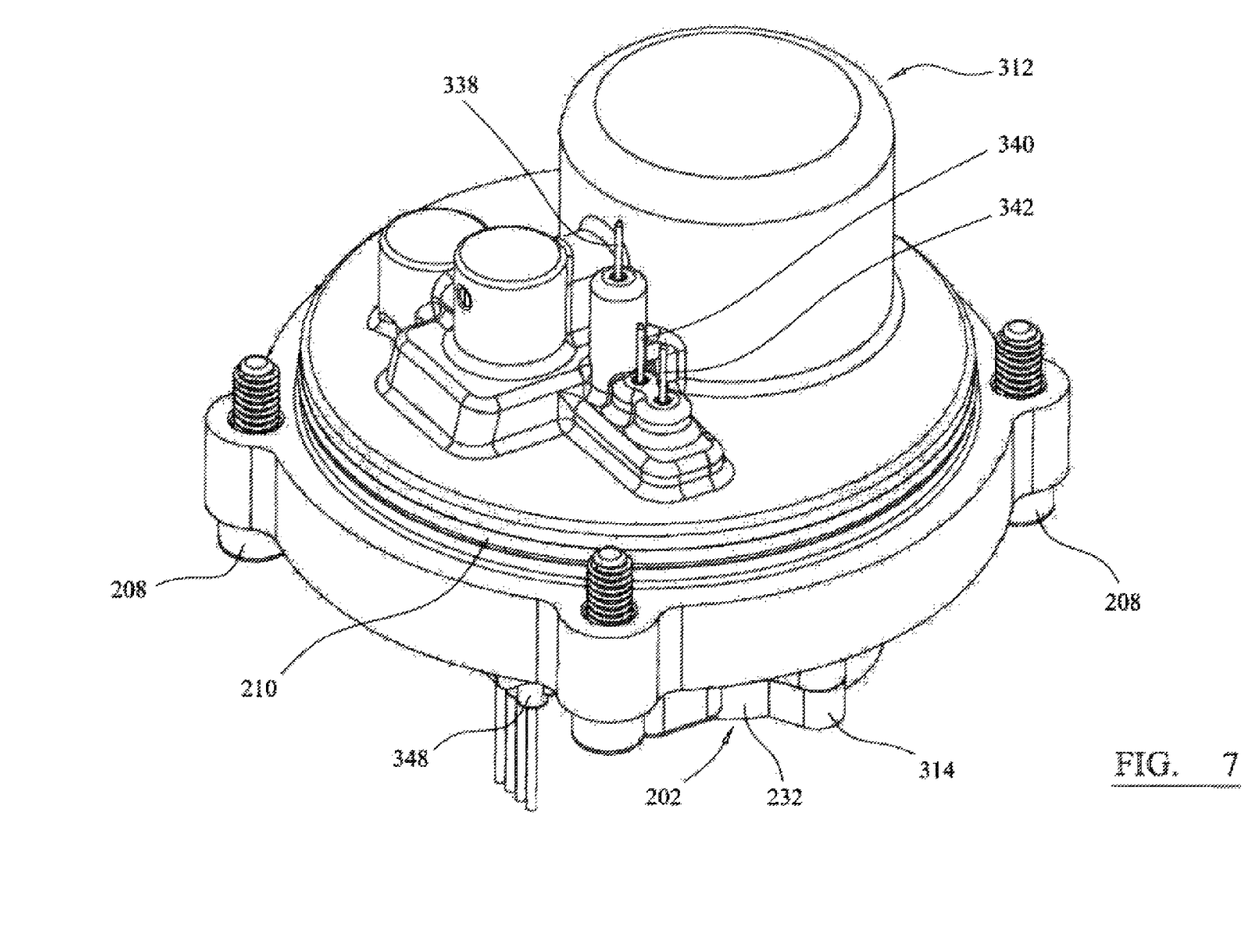
FIG. 7 is a perspective view of the water filter of FIG. 5 coupled to a base of a fuel filter.
Figure 8:
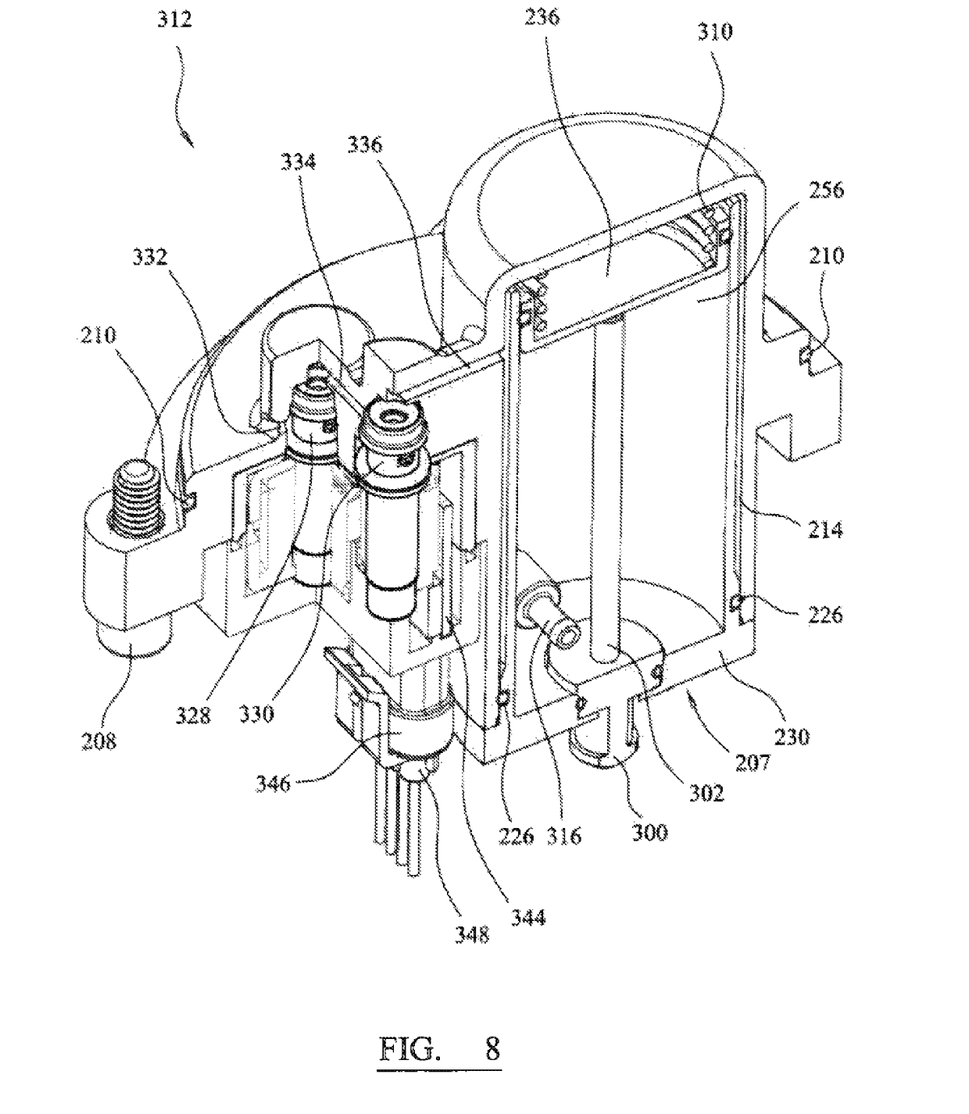
FIG. 8 is a cross sectional view of the coupled water filter and fuel filter base of FIG. 7.

Referring now to FIGS. 7 and 8, these illustrate the water filter 202 coupled to a fuel filter base 312. FIG. 7 is a perspective view of the upper side of the fuel filter base 312 and only the base 232 of water filter 202 and a locking lug 314 are visible. FIG. 8 is a cross sectional view of the water filter 202 and fuel filter base 312 of FIG. 7 from the same perspective, with the cut away portions chosen to showing internal structures of the fuel filter base 312. The fuel filter base 312 is arranged to be coupled to a filter housing forming the remainder of a filter body (not illustrated) by screws 208 and sealed to the housing to form a closed filter body by an O-ring 210. When coupled to the filter housing, the fuel filter base 312 forms the base of a filter bowl to collect water filtered from fuel. The water filter 202 is received within cavity 214 within the fuel filter base 312 and sealed in position by O-ring 226 as described above to form an annular space surrounding the water filter 202 within the cavity 214. The annular space within cavity 214 communicates with water filter inlet 216 (not visible in FIG. 8) and then valve 316 to allow water from the filter bowl to enter the water filter 202. It can be seen that above filter cap 236, the spring 310 is compressed against the closed end of cavity 214 to transfer a compressive force to the filter media 256 within shell 230. Cap 236 remains spaced apart from outlet tube 302 to allow filtered water to exit the water filter 202 from the top of the filter. Outlet 300 may be coupled to a storage tank (not illustrated) or via a hose to a position within the engine bay where the cleaned water may be discharged onto the road.

The water filter 202 of FIG. 5 is arranged to be coupled to a fuel filter positioned on the pressure side of a vehicle fuel supply system (that is, downstream of a low pressure fuel pump generating up to approximately 6 bar). The pressurised fuel serves to drive water through the water filter 202. FIGS. 7 and 8 together show the flow path of water from the filter bowl into the annular space within cavity 314, and then into the water filter.

First and second solenoid valves 328, 330 are housed within the filter base 312 to control the flow of water from the filter bowl. Solenoid valves 328, 330 are provided in series to control the flow of water from the filter bowl to the water filter 202. A fuel filter bowl outlet 332 allows water to flow to the first solenoid valve 328. First solenoid valve 328 can be opened to allow water to flow via passage 334 to the second solenoid valve 330. When the second valve is opened, water can flow via passage 336 into cavity 314, entering the annular space towards the top of the cavity 314, from where the water flows downwards and through inlet 216 into water filter 202. Water is driven under pressure from fuel filter bowl outlet 332 through the water filter 202 to the outlet 300 under the selective control of the first and second solenoid valves 328, 330. Two valves are provided for redundancy to ensure that pure fuel is not released to the water filter 202 in the event of the failure of a single valve. It will be appreciated that alternative valves may be used. It will also be appreciated that in alternative embodiments one or more valves may be used. The solenoid valves 328, 330 may, for instance, comprise nominally 14 W solenoids driven by a 24V control signal.

Figure 9:
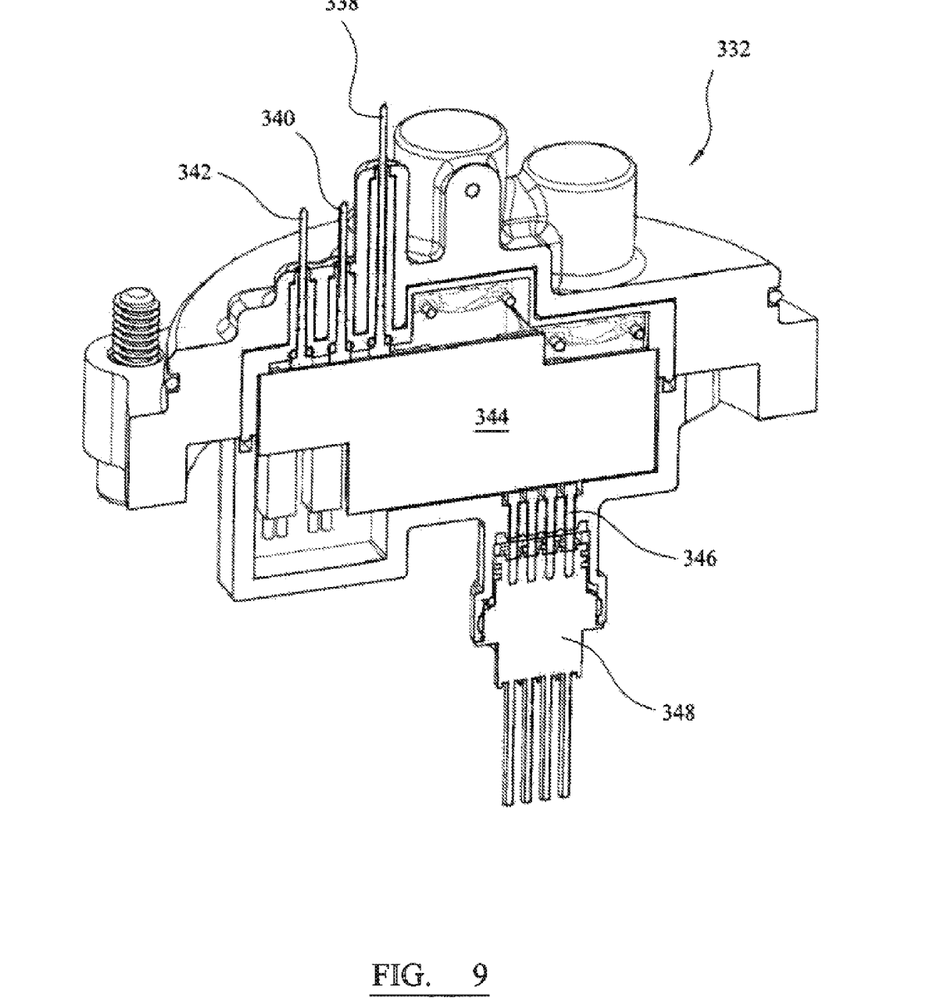
FIG. 9 is an alternative cross sectional view of the coupled water filter and fuel filter base of FIG. 7 showing portions of the fuel filter base only.

As shown in FIGS. 7 and 9, within the fuel filter base 312 there is provided two water-in-fuel (WIF) sensors comprising three sensor electrodes 338, 340, 342 arranged to provide water level signals to a processing unit such as a microprocessor within the fuel filter base 312 (shown in FIG. 9 as processor 344). The WIF sensors operate by passing electricity through the liquid within the fuel filter base 312 between pairs of electrodes. Effectively WIF sensor electrode 340 is shared between the two WIF sensors, as will be explained below. This eliminates the need to have a fourth electrode. Processor 344 is arranged to receive data from the WIF sensor electrodes 338, 340, 342, to control the opening and closing of the solenoid valves 328, 330 and to provide data to an Engine Control Unit (ECU, not illustrated). The ECU is typically a general purpose ECU that is also responsible for controlling other aspects of the engine operation in addition to the water filter. Data is transferred to and from the processor 344 and the ECU via a 4-pin plug 346, which also supplies power to the processor 344. FIG. 9 shows a connector cable and plug 348 coupled to the plug 346. Plug 346 may for instance comprise a standard AMP connector.

A first WIF sensor comprises electrodes 338 and 340. Electrode 338 is raised up relative to the other electrodes 340, 342, which are at the same level. A first WIF sensor is arranged to indicate whether the amount of water in the filter bowl is above or below a first, high water threshold. That is, when the water level is above electrode 338 this is detectable by a change in the current passing between electrodes 338, 340 (or alternatively a change in the voltage between the electrodes) indicating that they are separated only by water rather than fuel or a mixture of fuel and water. A second WIF sensor comprises electrodes 340, 342 and is arranged to indicate whether the amount of water in the filter bowl is above or below a second, low water threshold. When the water level falls below the level of either electrode 340, 342 then this is detectable by a change in the current passing between electrodes 340, 342 (or alternatively a change in the voltage between the electrodes). When the water level is between the electrodes 340, 342 and electrode 338 the first WIF sensor indicates that the water level is below the high water threshold and the second WIF sensor indicates that the water level is above the low water threshold. The high water threshold may be 250 ml and the low water threshold may be 100 ml. Collectively, the two WIF sensors provide signals to processor 344 indicating whether the water level is above the high water threshold, between the high and low water thresholds, or below the low water threshold.

Processor 344 is arranged to control solenoid valves 328, 330 to release water from the filter bowl when the first WIF sensor indicates that the amount of water in the bowl is above the high water threshold. Specifically, processor 344 is arranged to trigger a controlled release of a predetermined amount of water through the solenoid valves 328, 330 into the water filter 202 in response to detecting that the amount of water exceeds the high water level. The amount of water released is dependent upon the amount of time that the valves are opened and the pressure within the fuel filter. The pressure may either be directly measured or it may be estimated.

After a controlled release of water from the filter bowl, if the water level remains above the high water level the processor 344 is arranged to trigger further controlled releases of water according to a predetermined cycle. For instance, the processor 344 may be arranged to release 10 ml of water from the filter bowl once every 4 minutes until the amount of water reduces below the high water threshold. The amount of water released and the time between releases of water is chosen to ensure that water remains within the water filter 202 for a sufficient length of time to ensure adequate filtering. For instance, the amount of water released may equate to half the volume of the water filter 202. Additionally, the amount of water released is chosen to ensure that the water level does not fall below the low water threshold, to minimise the risk of causing pure fuel to flow to the water filter 202. As the water filter 202 is filled with water from the bottom, each time water is released into the filter under fuel pressure, existing water in the filter is displaced upwards towards the exit tube 302. Once the water level in the filter bowl reduces below the high water threshold, the processor stops further releases of water. If the water level falls below the low water threshold, as detected by the second WIF sensor then this is indicative of a fault in the system causing uncontrolled release of water, and then fuel. The processor 344 is arranged to send a signal to the ECU, which may in turn supply a visual or audible warning to the vehicle operator.

The ECU can be arranged to count the number of cycles of releases of water in response to signals from the processor 344 each time a release cycle takes place. A predetermined maximum number of cycles is chosen corresponding to the maximum amount of water at expected levels of hydrocarbons that can be safely filtered by the water filter 202 before the filtering medium 256 becomes exhausted. The amount of water that can be safely filtered, and hence the volume and type of filtering medium 256 used in the water filter 202, is chosen according to the amount of water that is expected to be filtered from a vehicle fuel supply during a vehicle service interval. That is, the number of cycles that ECU is arranged to allow, and that the water filter 202 can safely process, should be greater than the expected maximum number of cycles encountered during a vehicle service interval. Alternatively, the water filter 202 may be intended to last for the life of the vehicle, assuming averages concentrations of water in fuel supplies and the level of pollutants in the water. If the predetermined maximum number of cycles is reached during a service interval then the ECU may be arranged to warn the vehicle operator that the water filter 202 requires replacement sooner than the next planned vehicle service. It will be appreciated that alternatively, the processor 344 onboard the water filter 202 may be arranged to count the number of cycles and send a signal to the ECU when the predetermined maximum number is reached. However, in practice it is likely to simpler for the ECU to maintain this count. It will be appreciated that the ECU may be arranged to count the number of release cycles, or to count downwards from the predetermined maximum number of cycles. Additionally, in certain embodiments there may be two or more warning signals to the vehicle operator, a first indicating that the maximum number of cycles has almost been reached and a second which indicates that the maximum has been reached and the water filter may no longer be adequately filtering water. After the maximum number of cycles has been reached the processor 344 will continue to initiate release cycles in response to signals from the WIF sensors as it will continue to be necessary to dispose of water separated from the fuel supply to prevent damage to the engine.

As discussed above, the water filter 202 incorporates an additional safety feature preventing the release of unacceptable levels of hydrocarbons by the provision of inlet valve 316. The filter media 256 may become exhausted at a faster rate than anticipated when the number of cycles of water release is chosen, for instance by the water being more contaminated than expected. The inlet valve 316 is arranged to reduce or block the flow of water into the water filter 202 before the filtering medium 256 is completely exhausted, that is before the concentration of pollutants in water exiting the water filter exceeds the predetermined level. The effect is to reduce or completely stop the reduction of the water level in the filter bowl during a release cycle. During a release cycle the solenoid valves are opened but the level of water does not go down at all or at least not as much as expected as the flow is partially or fully cut off by the water filter inlet valve 316. Consequently the processor 344 triggers further release cycles if the water level stays above the high water level. The maximum number of cycles will be quickly reached, and this may be detected by the ECU or the processor 344 which maintains the count of cycles. As noted above, a warning signal may be provided to the vehicle operator. Effectively, the ECU (or the processor 344) indirectly monitors the state of the inlet blocker valve 316 by monitoring the variation in water level in the filter bowl during planned releases of water.

The water filter inlet valve 316 serves an additional safety function in the event of the release of pure fuel from the fuel filter, for instance if both solenoid valves 328, 330 fail and are left in an open state simultaneously. As discussed above, when water passes through the water filter inlet valve 316, a proportion of the hydrocarbons present in the water are absorbed by the valve plug 324. If pure fuel passes to the valve 316 then the valve plug 324 will rapidly absorb a large amount of hydrocarbons and its capacity to absorb further hydrocarbons will be quickly reached. The valve plug 324 will change state and the flow of further fuel into the water filter 202 will be limited or stopped altogether. Once fuel can no longer exit the fuel filter bowl via the water filter 202, the level of water in the bowl will begin to rise again until it exceeds the high water level. The processor 344 will trigger water release cycles as normal, but because the water filter inlet valve 324 is blocked, the water level in the filter bowl will not go down. As described above, further release cycles will be triggered until the maximum number of cycles is reached, and a warning signal is provided to the vehicle operator indicating that the water filter 202 requires changing. During servicing of the water filter 202 the functioning of the solenoid valves 328, 330 may be checked and they may be repaired if necessary.

Although the processor 344, the WIF sensors and the onboard control of one or more solenoid valves has only been described in detail in connection with the third embodiment of the invention, it will be appreciated that they may equally be applied to the first and second embodiments of the invention. Such onboard processing and control would be in place of the transmission of the water-in-fuel signals from the fuel filter base to the ECU and control of the or each solenoid valve from the ECU as it is described above in connection with FIGS. 1 to 4.

Water filters in accordance with embodiments of the present invention allow the water to be cleaned such that the amount of hydrocarbons is reduced to less than or equal to 2 ppm. The cleaned water may then be discharged without being a source of pollution and in accordance with EU water pollution regulations. Furthermore, the water filters comprise an inbuilt means of indicating when the filter requires replacement which may be monitored, for instance by the ECU, and used to alert a vehicle operator. Consequently, the size and cost of the water filters may be reduced as they need not be based upon an overly conservative estimate of the amount of water to be cleaned between vehicle servicing intervals.

In addition to mandating limits on the proportion of hydrocarbons in discharged water, European regulations also place restrictions on other contaminants, for instance certain heavy metals such as cadmium and mercury. Although not normally present in diesel, other contaminants such as these may be present if the water, which contaminates the fuel, also contains those contaminants. Certain embodiments of the present invention may also filter such contaminants from water separated from fuel, according to the nature of the filter media used.

Further modifications to and applications of the present invention will be readily apparent to the appropriately skilled person without departing from the scope of the appended claims.

What is claimed is:

1. A water filter comprising:
a closed shell having an inlet and an outlet;
a filter media within the shell arranged such that water flowing from the inlet to the outlet passes through the filter media, the filter media being arranged to filter hydrocarbons from the water to reduce the proportion of hydrocarbons in water exiting the water filter to below a predetermined threshold; and
a valve arranged such that water passing through the water filter passes through the valve, the valve comprising a chamber housing a plug of material arranged to absorb a predetermined proportion of hydrocarbons present in water passing through the valve and to change its material properties in response to absorbing hydrocarbons to restrict or block the flow of water through the water filter before exhaustion of the filter media causes the proportion of hydrocarbons in water exiting the water filter to rise above the predetermined threshold.

2. A water filter according to claim 1, wherein the shell comprises first and second ends and a side wall, the inlet being positioned in the side wall of the shell proximal to a first end and the outlet being positioned in the first end of the shell, the water filter further comprising an O-ring extending around the shell between the inlet and the first end.

3. A water filter according to claim 2, wherein the outlet is coupled to an outlet tube extending from the first end towards an opposite second end of the water filter and the filter media fills the space between the first and second ends of the water filter.

4. A water filter according to claim 3, wherein the second end of the shell is arranged to slide within the shell side wall, the water filter further comprising a compression spring coupled to the second end of the shell outside of the shell and extending above the shell the compression spring being arranged to transfer a compressive force to the filter media within the shell.

5. A fuel filter, comprising:
a water filter according to claim 1;
a sealed chamber having a fuel inlet and a fuel outlet separated by the filter media arranged to allow fuel to pass through and to prevent water from passing through, the fuel filter being arranged such that in use a mixture of fuel and water passes into the chamber through the fuel inlet, filtered fuel passes out of the first chamber through the outlet and water collects in the chamber, the chamber having a water outlet arranged in use to be positioned at the bottom of the chamber;
a valve coupled to the water outlet; and
a cavity located in an exterior portion of the chamber having a cavity inlet coupled to the valve;
wherein the cavity is arranged to receive the water filter such that the cavity inlet is in fluid communication with the water filter inlet and the cavity outlet is in fluid communication with the water filter outlet.

6. A fuel filter according to claim 5, further comprising: a water level sensor within the sealed chamber arranged to provide a water-in-fuel signal if the level of water within the sealed chamber exceeds a predetermined level; and
a processor arranged to receive the water-in-fuel signal and arranged to control the operation of the valve in response to the water-in-fuel signal to selectively release water from the sealed chamber to the water filter according to a predetermined water release cycle.

7. A fuel filter according to claim 6, wherein the processor is arranged to provide an output signal indicating that a release cycle has taken place.

* * * * *